United States Patent
Jibinlian

(10) Patent No.: US 11,691,479 B2
(45) Date of Patent: Jul. 4, 2023

(54) AIR VENT DIFFUSER

(71) Applicant: Anahit Jibinlian, North Hollywood, CA (US)

(72) Inventor: Anahit Jibinlian, North Hollywood, CA (US)

( * ) Notice: Subject to any disclaimer, the term of this patent is extended or adjusted under 35 U.S.C. 154(b) by 59 days.

(21) Appl. No.: 16/906,911

(22) Filed: Jun. 19, 2020

(65) Prior Publication Data

US 2020/0406724 A1   Dec. 31, 2020

Related U.S. Application Data

(60) Provisional application No. 62/868,774, filed on Jun. 28, 2019.

(51) Int. Cl.
*B60H 1/34* (2006.01)

(52) U.S. Cl.
CPC ... *B60H 1/3435* (2013.01); *B60H 2001/3471* (2013.01)

(58) Field of Classification Search
CPC .......... B60H 3/0028; B60H 2001/3471; B60H 1/0028; B60H 1/3435

USPC ..... 454/155, 284–304, 298; 239/34, 44, 289
See application file for complete search history.

(56) References Cited

U.S. PATENT DOCUMENTS

| | | | |
|---|---|---|---|
| 6,102,660 A * | 8/2000 | Lee ...................... | B60H 3/0028 416/146 R |
| 10,173,607 B1 * | 1/2019 | Omelchenko ........ | B60H 3/0028 |
| 2017/0080877 A1 * | 3/2017 | Boas .................... | B60R 11/0241 |

* cited by examiner

*Primary Examiner* — Vivek K Shirsat
(74) *Attorney, Agent, or Firm* — Arentfox Schiff LLP

(57) ABSTRACT

Aspects presented herein provide a solution to the problem of conditioned air blown into the passenger compartment in a concentrated direction and the discomfort that users may experience from the concentrated conditioned air. The apparatus includes a plate portion having a central flat surface and angled side surfaces, and a ball joint extending from a rear surface of the plate portion. The apparatus includes a stem portion having a socket and a plurality of legs. The stem portion may be removably coupled to the plate portion at a rear surface of the central flat surface. The ball joint of the plate portion may be received within the socket such that the positioning of the plate portion may be adjustable.

12 Claims, 4 Drawing Sheets

AIR VENT DIFFUSER

CROSS REFERENCE TO RELATED APPLICATION(S)

This application claims the benefit of U.S. Provisional Application Ser. No. 62/868,774, entitled "Air Vent Diffuser" and filed on Jun. 28, 2019, which is expressly incorporated by reference herein in its entirety.

BACKGROUND

Technical Field

The present disclosure relates generally to diffuser devices, and more particularly, to an air vent diffuser.

INTRODUCTION

Numerous automobiles, such as passenger cars, sport utility vehicles, trucks, station-wagons, and mini-vans, have air conditioning (AC) vents embedded within the dash. Automobile passengers position these vents such that hot or cold air may blow directly onto a body portion, such as a face, hand, or arm, for example. However, the conditioned air (e.g., hot or cold air) being blown directly onto the person may cause discomfort due to the vent being positioned to blow air directly onto a specific body part. The constant flow of conditioned air on the specific body part may lead to discomfort when the conditioned air is being blown from the vents. For example, a constant flow of cold conditioned air being blown from the AC vents onto a specific body part may cause discomfort.

In other instances, such as when the weather is hot or cold, and the car's AC is first started, the temperature of the air initially coming out of the vent can be hot on hot days, or cold on cold days, such that it takes a period of time (e.g., a few minutes) for the air coming out of the vent to reach the desired temperature set on the air conditioning controls. For example, on a hot day, the car driver or passenger may reach out with their hand and partially cover the AC vent to re-direct the air exiting the AC vent in various directions within the car. Placing the hand in front of and/or near the AC vent allows for the air to be diffused within the vehicle and prevents the hot air from blowing on their face and/or other body parts. Hot air blowing in the passenger's face and/or other body parts may be unpleasant and may cause some people to get headaches or other unpleasant sensations from direct air flow. Also, repeatedly placing one's hand near and in front of the AC vent to diffuse the air may also be bothersome. There exists a need to eliminate discomfort caused by conditioned air being blown directly onto a specific body part when operating the AC system within passenger cars. Simply closing the vent or changing the direction that conditioned air is blown out of the vent may not be sufficient to achieve a reduction of or elimination of the discomfort.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Passenger vehicles equipped with AC allow the driver and/or passenger to adjust the climate within the passenger compartment of the vehicle to a desired setting. However, the manner in which the conditioned air enters the passenger compartment may provide some level of discomfort to users. Aspects presented herein provide a solution to the problem of the direction or concentration of the conditioned air that is blown into the passenger compartment and the discomfort that users may experience from it.

In an aspect of the disclosure, an apparatus is provided to diffuse air from an air vent. The apparatus comprises a plate portion having a central flat surface and angled side surfaces, a ball joint extending from a rear surface of the plate portion. The apparatus comprises a stem portion having a socket and a plurality of legs. The stem is removably coupled to the plate portion at a rear surface of the central flat surface. The ball joint of the plate portion is received within the socket such that the positioning of the plate portion is adjustable. The apparatus may be configured to disperse air blowing onto the plate portion of the apparatus as air is blown into the passenger compartment of the vehicle from the AC vents.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
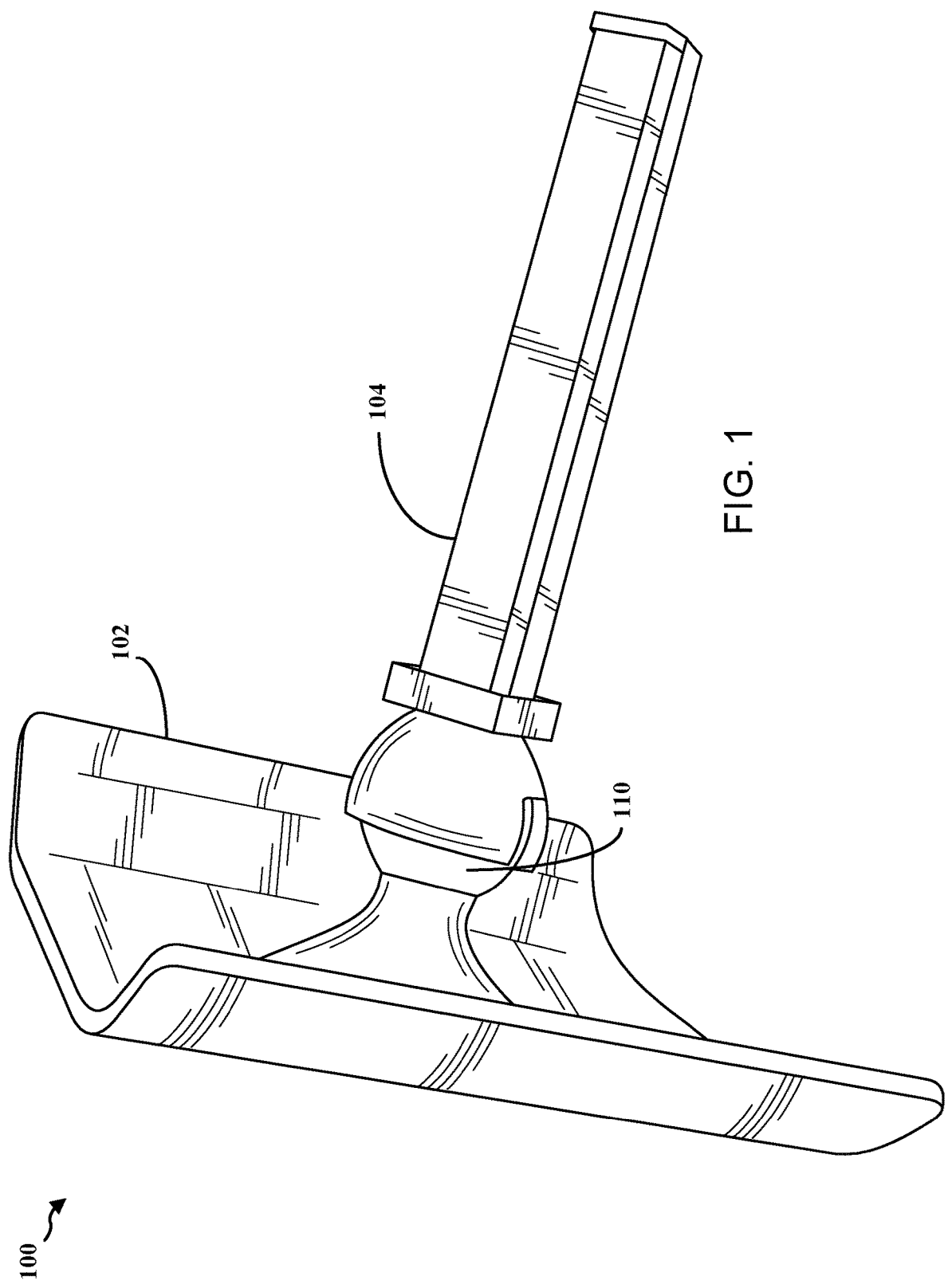
FIG. 1 is a perspective view of the air vent diffuser according to an aspect of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Passenger vehicles equipped with AC allow the driver and/or passenger to adjust the climate within the passenger compartment of the vehicle to a desired setting. The driver or the passenger is able to activate the AC to have conditioned air blown into the vehicle in order to adjust the temperature within the vehicle, as desired. For example, the AC may be used to increase the temperature within the vehicle, such that the conditioned air is heated and blown into the passenger compartment. In another example, the AC may be used to decrease the temperature within the vehicle, such that the conditioned air is cooled and blown into the passenger compartment. The rate that the conditioned air (e.g., heated or cooled) is blown into the vehicle may be controlled by the user. In addition, the intensity or level of the conditioned air may also be controlled by the user. Also, the direction that the conditioned air is provided from the AC system and enters the passenger compartment may be adjusted by the user. The manner in which the conditioned air enters the passenger compartment may provide some level of discomfort to users.

In some instances, the driver or passenger may place their hand in front of the AC vent to re-direct the air exiting the AC vent in various directions within the car. Placing one's hand in front of and/or near the AC vent allows for the conditioned air to be diffused within the vehicle and prevents the conditioned air from blowing directly onto a person's face or other body part. In some instances, the conditioned air may be concentrated on a particular portion of a person's body, which may cause discomfort and result in placing one's hand in front of and/or near the AC vent. However, users may become tired by placing and holding their hand in front of and/or near the AC vent. In some instances, people may try to place different items (e.g., book, notepad, magazine, purse, etc.), other than their hands, in front of and/or near the AC vent to diffuse the air and prevent a concentrated flow of air blowing on them. Having something near and in front of the vent, such that the item is spaced apart from the vent, may lessen the unpleasant feeling of the conditioned air exiting the AC vent until the desire air temperature is reached. However, using a different item, other than one's hand, to re-direct and diffuse the air flow may prevent any potential discomfort from the conditioned air exiting the AC vent, but the ability to adjust and/or control the different item so as to modify the manner in which the air exiting the AC vent is being diffused is likely not possible.

An apparatus, such as a vent diffuser, may distribute the air flow while the air temperature is being adjusted by the AC. The vent diffuser positioned near the vent may eliminate the need to re-direct the air exiting the vent with one's hand, and may also provide an alternative to positioning the car vent away from the person and/or closing the vent while cabin temperatures are being conditioned for the duration of vehicle operation.

The present disclosure is directed to providing an apparatus (e.g., a diffuser) that may be positioned near and/or in front of the AC vent and spaced apart from the AC vent, such that the apparatus at least partially covers the AC vent. The apparatus may be configured to re-direct or diffuse at least some of the air blown through the AC vent such that air being blown out the vent is not directed to a particular concentrated direction, and is instead distributed throughout the interior of the vehicle. The diffuser may prevent users from experiencing the unpleasant sensation provided from the initial flow and/or current flow of conditioned air from the AC vent when the AC is initially activated and/or from air exiting the vent at or around the selected temperature setting. The diffuser may also prevent users from experiencing an unpleasant sensation that may be provided from the continuous flow of air from the AC vent while the desired internal temperature of the passenger compartment is being reached.

The diffuser may be received by the air vent and configured to diffuse air exiting the air vent and entering the passenger compartment of a vehicle. In some aspects, the diffuser may reduce or disperse the conditioned air (e.g., cold or heated air) provided from the AC system and reduce discomfort that users may experience. For example, the diffuser may be configured to distribute the conditioned air throughout the passenger compartment of the vehicle as the conditioned air is being blown into the vehicle. The diffuser may prevent conditioned air that enters the passenger compartment from being concentrated in a particular direction, which may cause discomfort to inhabitants of the vehicle.

Figure 2:
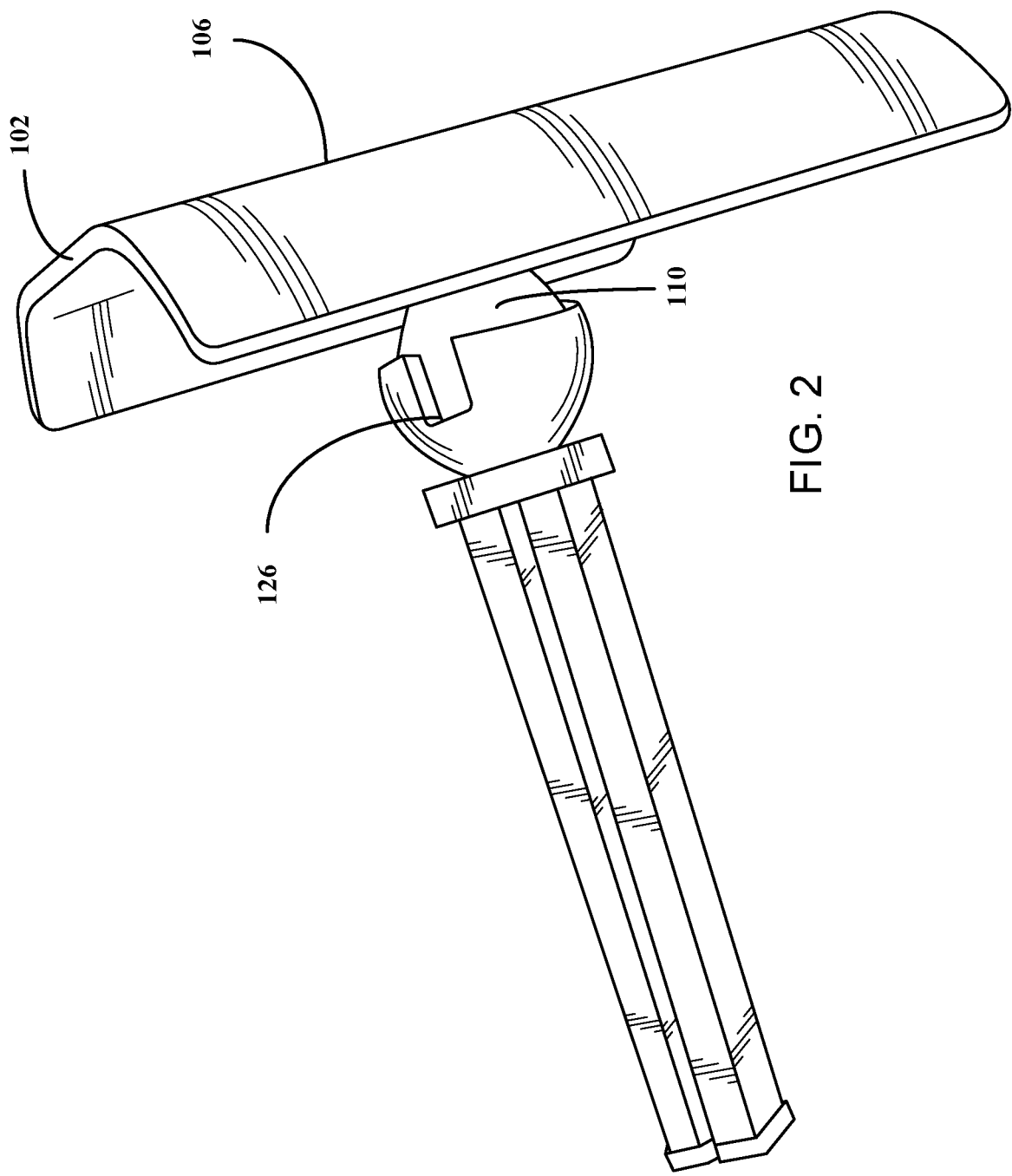
FIG. 2 is a side view of the air vent diffuser.
Figure 3:
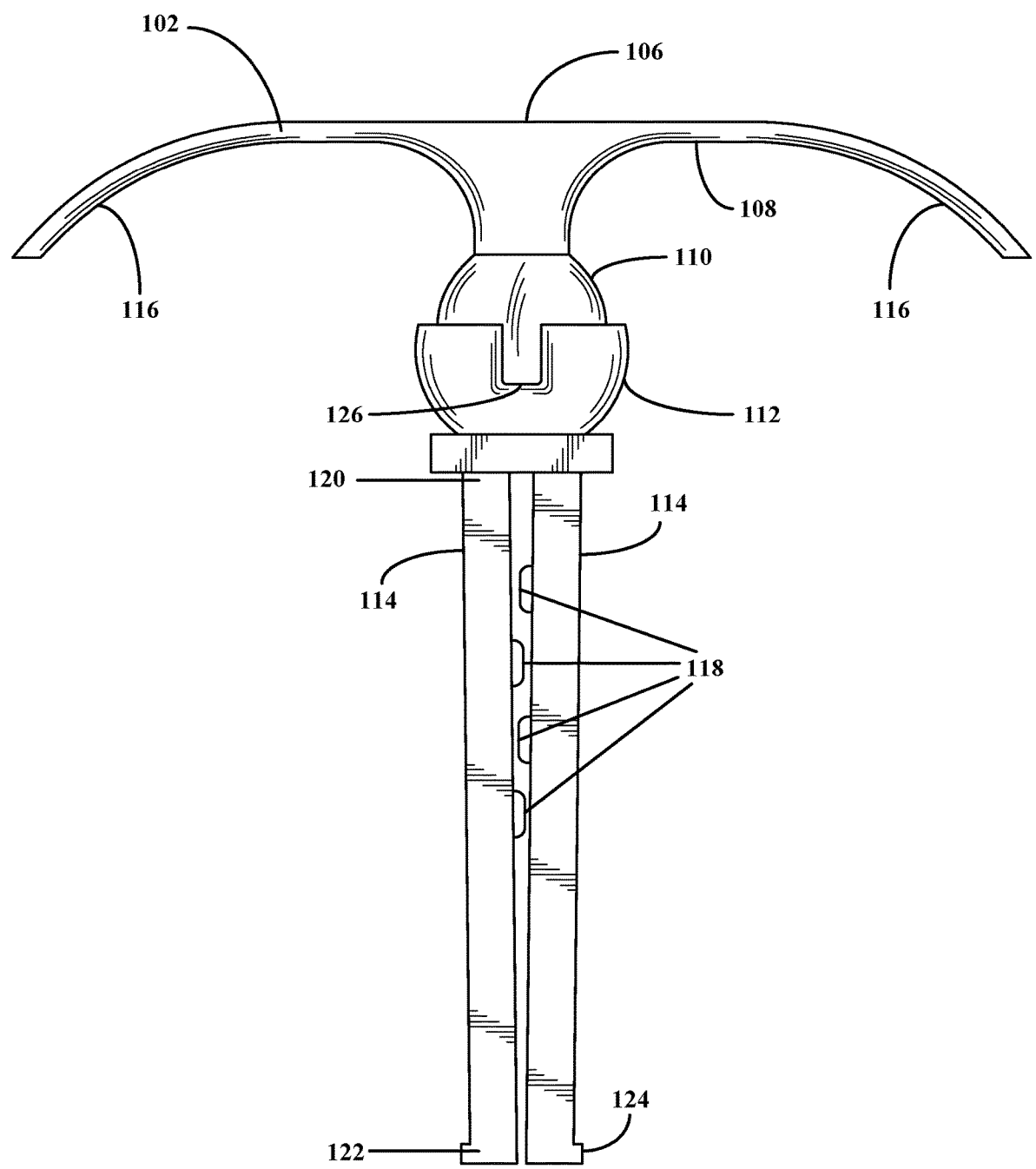
FIG. 3 is another side view of the air vent diffuser.
Figure 4:
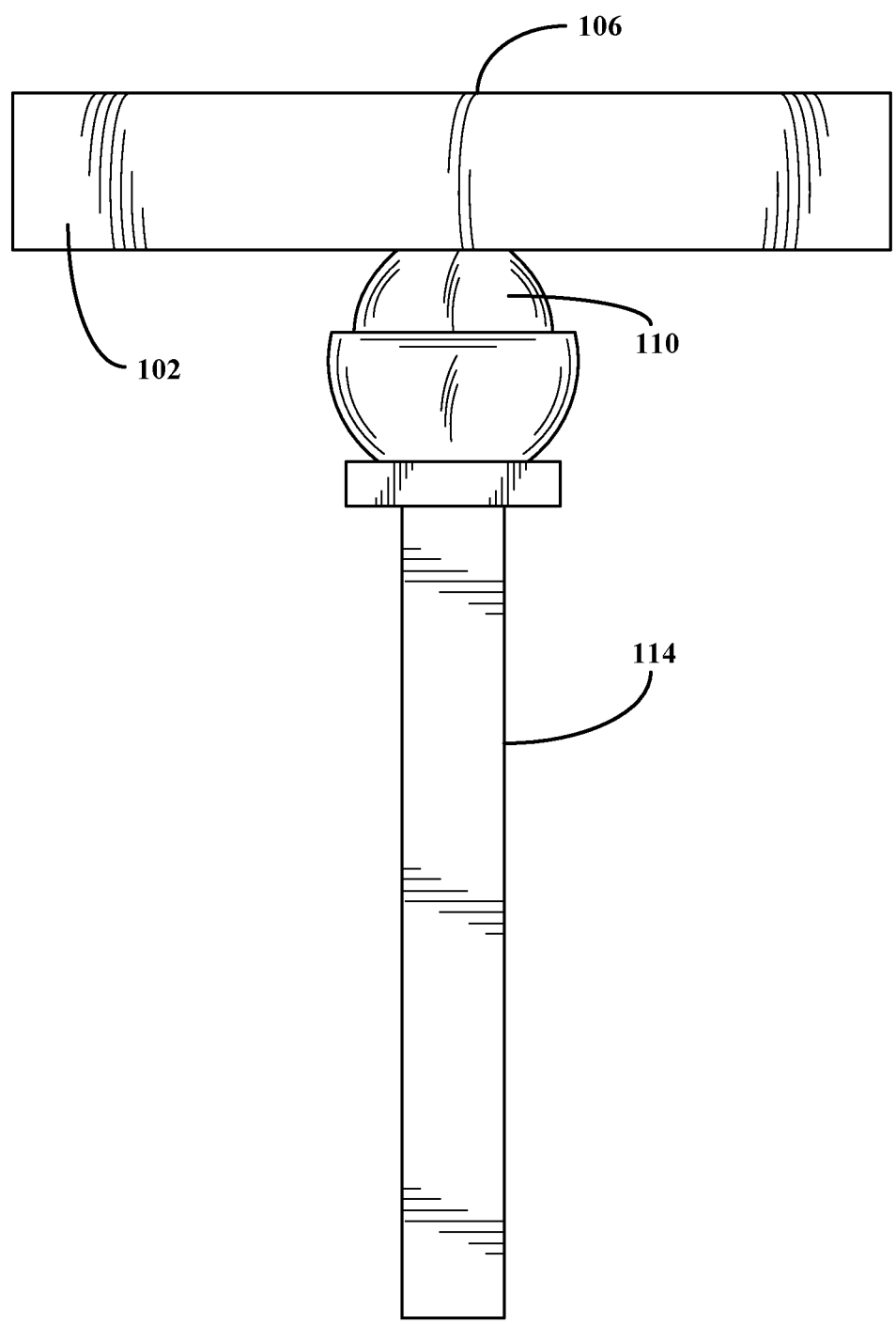
FIG. 4 is another side view of the air vent diffuser.

FIG. 1 is a perspective view of the air vent diffuser 100. The air vent diffuser 100 includes a plate portion 102 and a stem 104. The plate portion 102, as shown in FIGS. 2 and 3, may comprise a front surface 106 and a rear surface 108. A ball joint 110 may extend from the rear surface 108 of the plate portion 102, as shown in FIG. 1. The stem portion 104 may include a socket 112 and a plurality of legs 114. The socket 112 may be coupled to a first end of the legs 114. In some aspects, a plate may be interposed between the legs 114 and the socket 112, such that the legs and socket are coupled to opposite sides of the plate.

The plate portion 102 may comprise one or more curved portions 116. The one or more curved portion 116 may be along one or more outer edges of the plate portion. For example, the plate portion may comprise a rectangular shape and have curved portions 116, 116 along opposing edges of the rectangular shaped plate portion. The curved portions 116 may allow the air from the vent to be guided in opposing and/or various different directions along the curved portions 116 of the plate portion 102. In some aspects, the curved portions 116 may be along adjacent edges or other edges, and do not have to be along opposite edges. In the aspects of FIG. 1, the plate portion may comprise a rectangular shape, but the disclosure is not intended to be limited to the plate portion having a rectangular shape. In some aspects, the plate portion may be shaped in many different shapes, such as but not limited to a triangle, quadrilateral, a polygon of random sides, or the like.

The stem 104 may be configured to be removably coupled to the plate portion 102 at the rear surface 108 of the plate portion 102. For example, the ball joint 110 of the plate portion 102 may be received within the socket 112 of the stem 104. In some aspects, as shown in FIGS. 2 and 3, the socket 112 may comprise one or more openings 126 to allow the socket 112 to receive the ball joint 110. The opening 126 may allow the socket 112 to partially alter its shape to allow the ball joint 110 to be inserted into the socket 112. Upon insertion of the ball joint 110, the socket 112 returns to its original shape and the ball joint is securely fastened within the socket. The opening assists in allowing the plate portion 102 from being removable from the stem portion 104. The configuration of the ball joint 110 and the socket 112 allows the positioning of the plate portion 102 to be adjusted. The adjustability may allow the air flow from the AC vent to be dispersed within the passenger compartment. In some aspects, the plate portion 102 may comprise a socket 112 while the stem 104 comprises a ball joint 110, such that the ball joint 110 is received by the socket 112 on the plate portion 102, in order to couple the stem 104 and plate portion 102 together. As discussed above, the plate portion 102 may comprise many different shapes, such as but not limited to, circular, triangular, quadrilateral, and/or any other polygonal shape.

The legs 114 may comprise one or more tabs 118 on a surface of the legs 114. Each of the legs 114 may be configured such that the one or more tabs 118 are facing the one or more tabs 118 of the other leg 114. For example, in the aspect shown in FIG. 3, the diffuser comprises two legs 114 with each leg having one or more tabs 118 on a surface such that the one or more tabs 118 are facing the one or more tabs on the opposing leg 114. In such aspect, the one or more tabs 118 can be positioned on the surface of the respective leg 114, such that the one or more tabs 118 are spaced apart.

In some aspects, the spacing of the one or more tabs 118 on opposing legs 114 may be configured such that the one or more tabs 118 are offset from the one or more tabs 118 from the opposing leg 114. In yet some aspects, the one or more tabs 118 on a first leg 114 may be configure to at least partially extend into a gap between the one or more tabs 118 on a second leg 114, wherein the first leg is opposite the second leg. The gap between the one or more tabs 118 may be defined by the separation between the one or more tabs 118.

In some aspects, the legs 114 of the stem portion 102 may be configured to provide a tapered opening between the legs 114. For example, in the aspect of FIG. 3, the separation between the legs 114 at a first end 120, near the socket 112, may be wider than the separation between the legs at a second end 122, opposite the socket 112. As such, the separation between the legs 114 decreases as the legs extend from the first end 120 to the second end 122. The legs 114 may be configured to provide a compression force in order to securely fasten the diffuser 100 to a structure. The compression force may be applied due in part to the decreased separation between the legs 114. The legs 114 may be configured to provide the compression force onto the structure due in part to the tapered opening between the legs 114. In some aspects, at least one of the one or more tabs 118 may be configured to exert a force onto the structure to assist in securely fastening the diffuser to the structure. The compression force applied by the legs 114 may cause the one or more tabs 118 to exert a force onto the structure. In some aspects, the structure may comprise a portion of a vent from a vehicle. The legs 114 may be position or inserted into a portion of the vent such that the tapered opening receives at least a portion of the vent. The compression force may be exerted onto at least the portion of the vent to securely fasten the diffuser to the vent. Furthermore, the one or more tabs 118 may contact at least a portion of the vent to assist in securely fastening the diffuser to the vent.

The ball joint 110 and socket 112 configuration may allow the plate portion 102 to be adjusted to direct the diffused air as desired by the user. In some aspects, the stem portion 102 may comprise two or more legs 114 extending from the socket 112. In some aspects, the two or more legs 114 may be arranged to be tapered such that the separation between the two or more legs 114 decreases the farther along the legs extend away from the socket 112. The tapered legs may allow for the legs to apply a tension or compression force onto at least a portion of a vent or structure to secure the diffuser onto the vent or structure. In some aspects, one or more of the legs may comprise an extension 124 at the second end 122 of the leg that may be configured to catch a portion to the vent or vent structure that may assist in preventing the diffuser 100 from falling off the vent or structure. For example, the extensions 124 may catch or latch onto at least a portion of the vent if the diffuser were to become dislodged. The extensions 124 may assist in preventing the diffuser from falling from the vent.

The plate portion 102 may be configured to pivot about the socket 112 of the stem portion 102. In some aspects, air blowing onto the rear surface 108 of the plate portion 102 may be diffused by the plate portion. In some aspects, the manner in which the air is being diffused or re-directed may be adjusted by altering the configuration of the plate portion 102 within the socket 112. For example, the plate portion 102 may be pivoted in a horizontal or vertical direction about the socket 112. In some aspects, the plate portion 102 may be pivoted in a horizontal and a vertical direction about the socket 112. The plate portion 102 may also rotate clockwise or counter clockwise about the socket 112. In some aspects, the plate portion 102 may be adjusted by pivoting the plate portion 102 in a horizontal and/or a vertical direction about the socket, as well as rotating the plate portion clockwise or counter clockwise about the socket 112. This allows the user to adjust the plate portion 102 in order to diffuse the air blowing from the AC vent as desired.

At least one advantage of the disclosure is that the plate portion 102 of the diffuser 100 can be adjusted to diffuse the air blowing from the AC vent as desired by the user. The plate portion 102 may diffuse the conditioned air being blown into the passenger compartment, such that a constant flow of conditioned air is not blown on a specific body part, which may eliminate discomfort caused by the constant flow of conditioned air on the specific body part. In addition, the plate portion 102 may be able to distribute the conditioned air within the passenger compartment of a car at a faster rate than an AC vent without the diffuser 100. Typical AC vents may blow conditioned air into the passenger compartment at a concentrated direction. This may take a considerable amount of time to bring the climate within the passenger compartment to the desired setting because the conditioned air blown in a concentrated direction may not easily reach portions of the passenger compartment that are not within the path of the concentrated direction. The vent diffuser of the present disclosure may allow the conditioned air to be diffused within the passenger compartment as it enters the passenger compartment, such that the climate within the passenger compartment may reach the desired setting faster, due in part to the diffused air reaching portions of the passenger compartment that are not within the path of the concentrated direction. The vent diffuser also prevents the conditioned air from being blown in a concentrated direction onto a person which may provide some level of discomfort to users.

In some aspects, the plate portion 120 may be configured to receive an external item (not shown), such as but not limited to a pad of paper, business cards, or a cell phone. In some examples, the front surface 106 of the plate portion 102 may comprise at least one extension (not shown) that could be utilized to receive the external item. In some instances, at least one extension may be arranged as a locking structure that could receive a complementary locking device equipped on the external item, such as but not limited to a cell phone mount. The plate portion 102 may serve multiple purposes, such as diffusing air from the AC vent and providing a means for holding the external item. In yet some aspects, the plate portion 102 may be perforated such that some blown air may pass through the plate portion 102, while some blown air is diffused by the plate portion 102.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An air vent diffuser, comprising:
   a plate portion having a central flat surface and angled side surfaces, and a ball joint extending from a rear surface of the plate portion, wherein the angled side surfaces are angled towards the rear surface of the plate portion; and
   a stem portion having a socket and a plurality of legs, wherein the stem is removably coupled to the plate portion at a rear surface of the central flat surface, wherein the ball joint of the plate portion is received within the socket such that the positioning of the plate portion is adjustable.

2. The air vent diffuser of claim 1, wherein each of the plurality of legs comprises a plurality of tabs on a first surface, wherein each of the first surfaces of the plurality of legs are facing each other.

3. The air vent diffuser of claim 2, wherein the plurality of tabs are offset from the plurality of tabs from a respective opposing leg.

4. The air vent diffuser of claim 3, wherein the plurality of tabs at least partially extend into a gap between adjacent tabs of the respective opposing leg.

5. The air vent diffuser of claim 2, wherein a separation between each of the plurality of legs decreases as the plurality of legs extend away from the socket, such that the plurality of legs are configured to apply a compression force to be securely fastened to a structure.

6. The air vent diffuser of claim 5, wherein at least one of the plurality of tabs are configured to exert a force onto the structure due to the compression force.

7. The air vent diffuser of claim 1, wherein the ball joint is removably coupled to the socket of the stem portion.

8. The air vent diffuser of claim 1, wherein the plate portion is configured to pivot about the socket of the stem portion, such that air blowing onto the rear surface of the plate portion is diffused.

9. The air vent diffuser of claim 8, wherein the plate portion is configured to move horizontally or vertically about the socket.

10. The air vent diffuser of claim 8, wherein the plate portion is configured to rotate about the socket.

11. The air vent diffuser of claim 1, wherein a front surface of the plate portion comprises an extension.

12. The air vent diffuser of claim 11, wherein the extension is configured to support a separate device.

* * * * *